United States Patent [19]

Kawai

[11] 4,437,397

[45] Mar. 20, 1984

[54] AUTOMATIC PICKLE INJECTING APPARATUS

[75] Inventor: Keiichi Kawai, Amagasakishi, Japan

[73] Assignee: Futaba Denki Kogyo Kabushiki Kaisha, Osakashi, Japan

[21] Appl. No.: 365,087

[22] Filed: Apr. 2, 1982

[30] Foreign Application Priority Data

Apr. 2, 1981 [JP] Japan .................................. 56-50195
Jan. 25, 1982 [JP] Japan .................................. 57-10491

[51] Int. Cl.³ .............................................. A23B 4/02
[52] U.S. Cl. ........................................ 99/533; 99/535
[58] Field of Search .................. 99/494, 516, 532, 533, 99/535; 426/281, 58, 332; 27/21, 22 R, 24 R

[56] References Cited

U.S. PATENT DOCUMENTS 2,560,060 7/1951 Zwosta .................................. 99/533
3,677,169 7/1972 Francis .................................. 99/533

Primary Examiner—Timothy F. Simone
Attorney, Agent, or Firm—Antonelli, Terry & Wands

[57] ABSTRACT

An automatic pickle injecting apparatus includes a vertically movable tank containing a pickle, the tank being transversely provided with respect to the path along which the meat is conveyed, a plurality of needles suspended from the bottom of the tank, each of the needles having a passageway allowing the pickle in the tank to flow therethrough, the passageway communicating with an opening produced at the terminating end of the needle through which the pickle is discharged, a valve adapted to close and open the opening, the valve being movable along the length of the needle such that when the valve is lowered to its lowermost position, it closes the opening so as not to allow the pickle in the needle to flow therethrough, and with the valve being normally urged to its lowermost position.

10 Claims, 8 Drawing Figures

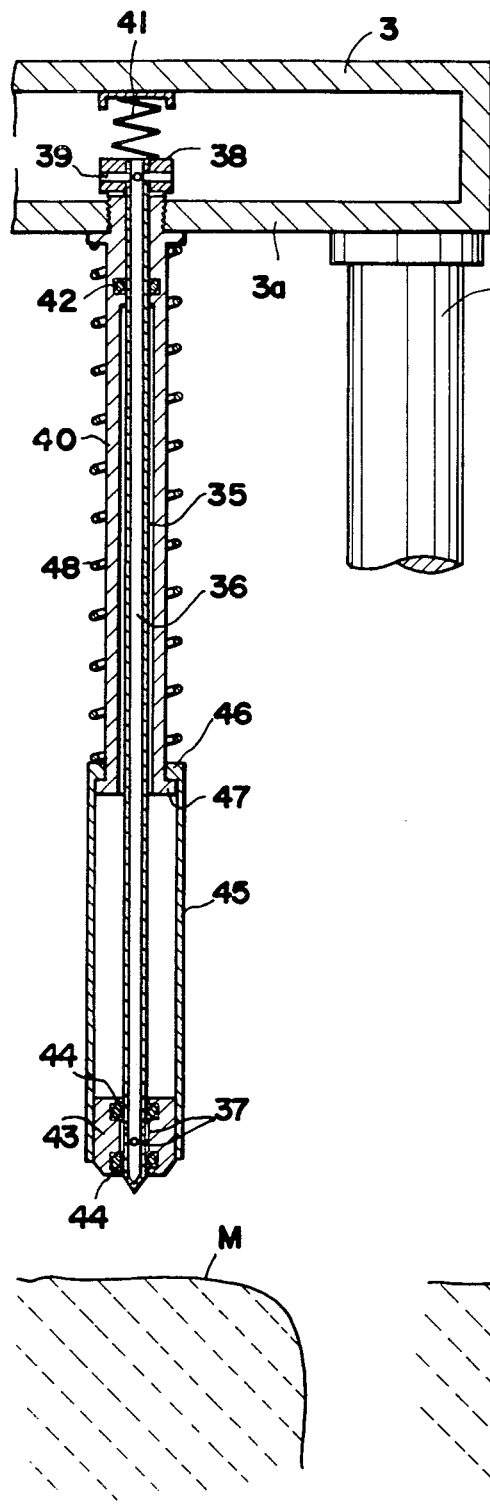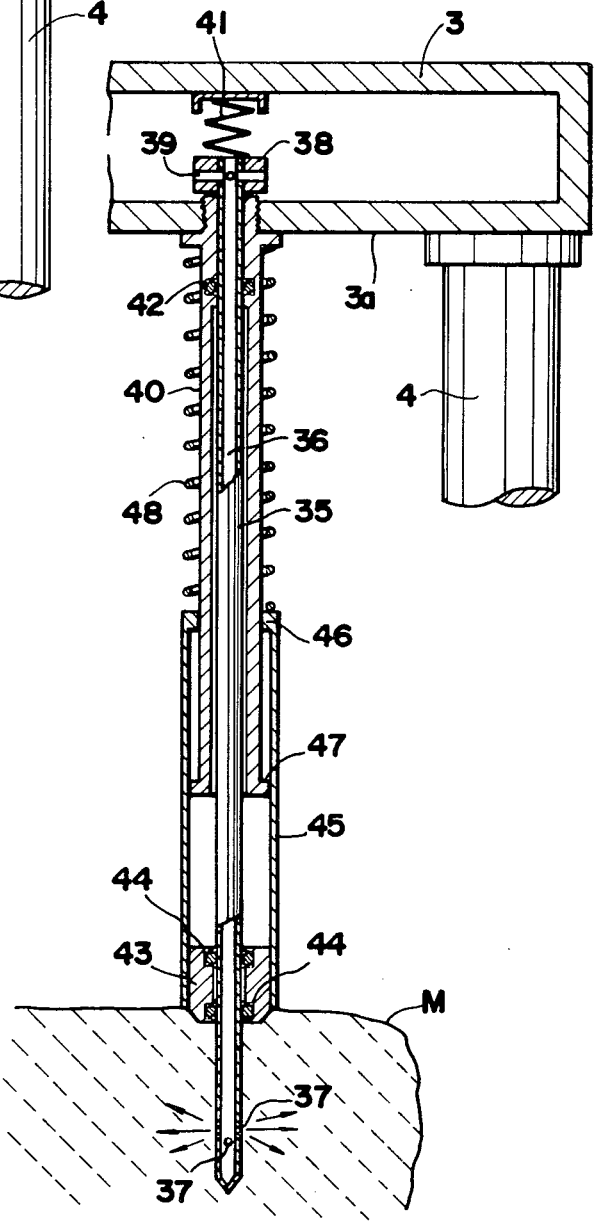

AUTOMATIC PICKLE INJECTING APPARATUS

BACKGROUND OF THE INVENTION

The present invention relates to an automatic pickle injecting apparatus for supplying meat with a pickle so as to increase its flavor and preserve its freshness. More particularly, the present invention relates to an automatic pickle injecting apparatus for supplying meat with a pickle, wherein the meat is being conveyed along its feeding path to a place where it is stuffed in casings into stuffed meat, such as sausages and bacon. The injection of pickle is intended to increase the flavor of meat and preserve its freshness, wherein the pickle contains spices, flavorings and antiseptics.

It is known in the art to employ an automatic pickle injecting apparatus in the process of stuffed meat. The known apparatus has a vertically movable tank in which a pickle is stored, the tank being located above a conveyor belt on which the meat is placed. The tank is provided with injector needles suspended therefrom toward the meat. As the tank is lowered, the top ends of the needles come close to the meat, wherein some of them are penetrated into the meat while the others are short of it because of uneven surface of the meat. Nevertheless, the pickle is spurted from all the needles. Consequently, in the needles failing to reach the meat, the pickle spills outside the meat, thereby resulting in the waste of the pickle. To save the waste, the spilled pickle must be collected and recirculated for re-use. Another disadvantage is that, in the needles penetrating into the meat, the pickle to be injected tends to become less than the required amount because of reduction in the internal pressure, which is due to the overflow through the needles failing to reach the meat. The unequal amount of pickle injected leads to poor quality and defective stuffed meat.

Furthermore, when the spilled pickle is pumped up for recirculating, the pickle is liable to rise in temperature and dilution, thereby degrading in its quality.

The collection of pickle for re-use is also required for other than the spilled one. The known apparatus has valves located in the connection of the tank and each needle, so that some portion of the pickle unavoidably remains between the valve and each outlet. The remaining pickle also spills over the meat or the empty conveyor belt after the valves have been closed. In addition, after the remaining pickle is discharged in this way, air is likely to enter the needles, and be introduced into the meat together with an injecting pickle in the subsequent process. The meat is dangerously contaminated with germs contained in the air.

OBJECTS AND SUMMARY OF THE INVENTION

The present invention is directed to the solution of the problems pointed out above with respect to the known pickel injecting apparatus, and has for its object to provide an improved automatic pickle injecting apparatus capable of avoiding unnecessary discharge of pickle from the injector needles failing to reach the meat.

Another object of the present invention is to provide an improved automatic pickling injecting apparatus which eliminates the necessity of collecting and recirculating a split pickle.

A further object of the present invention is to provide an improved automatic pickle injecting apparatus capable of preventing air from entering the meat.

According to one advantageous aspect of the present invention an automatic pickle injecting apparatus includes a vertically movable tank containing pickle, the tank being transversely provided with respect to the path along which the meat is conveyed, a plurality of needles suspended from the bottom of the tank, each of the needles having a passageway allowing the pickle in the tank to flow therethrough, the passageway communicating with an opening produced at the terminating end of the needle through which the pickle is discharged, a valve adapted to close and open the opening, the valve being movable along the length of the needle such that when the valve is at its lowermost position, it closes the opening so as not to allow the pickle in the needle to flow out therethrough, and means for urging the valve to lower to its lowermost position and close the valve.

Other objects and advantages of the present invention will become more apparent from the following description when taken in connection with the accompanying drawings which show, for the purpose of illustration only, several embodiments in accordance with the present invention, and wherein:

BRIEF DESCRIPTION OF THE DRAWINGS

FIG. 6 is a cross-sectional view, on an enalarged scale, showing a modified version of the injector unit;

FIG. 7 is a cross-sectional view showing the unit of FIG. 6 in operation; and

DETAILED DESCRIPTION OF THE INVENTION

Figure 1:
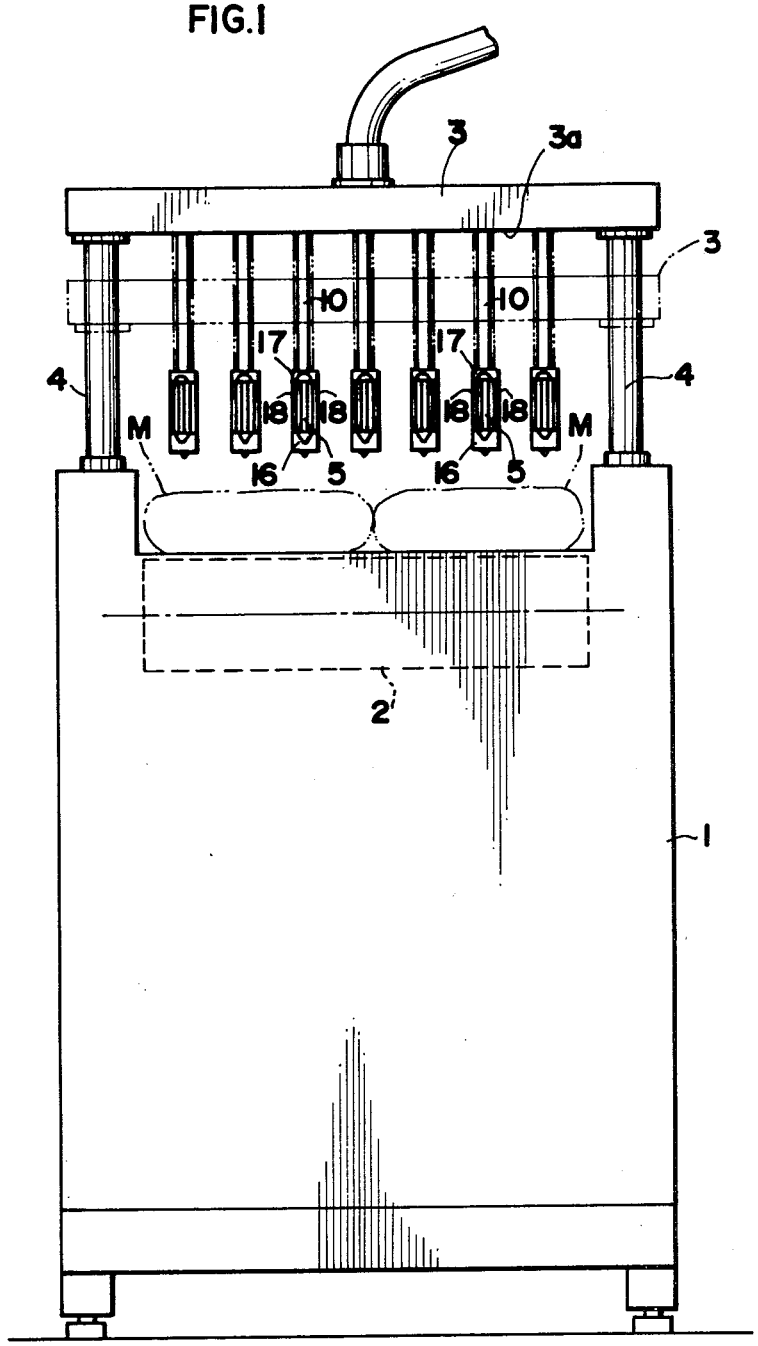
FIG. 1 is a front view showing an automatic pickle injecting apparatus constructed in accordance with the present invention.

Referring now to the drawings wherein like reference numerals are used throughout the various views to designate like parts, and more particularly, referring to FIG. 1, the automatic pickle injecting apparatus includes a body 1on which a belt conveyor 2 is provided in such a manner as to run along the length of the apparatus and to transport lumps of meat M in succession. It is intended that a pickle is introduced into the individual lumps of meat M under pressure in the course of transportation thereof, wherein, at the time of injection, the conveyor is stopped. This means that the meat M is intermittently fed.

The pickle is stored in a tank 3 which is transversely provided with respect to the feeding path of the meat M. The tank 3 is provided with supporting poles 4, with the poles 4 being movable up and down so as to enable the tank 3 to be periodically raised and lowered.

Figure 2:
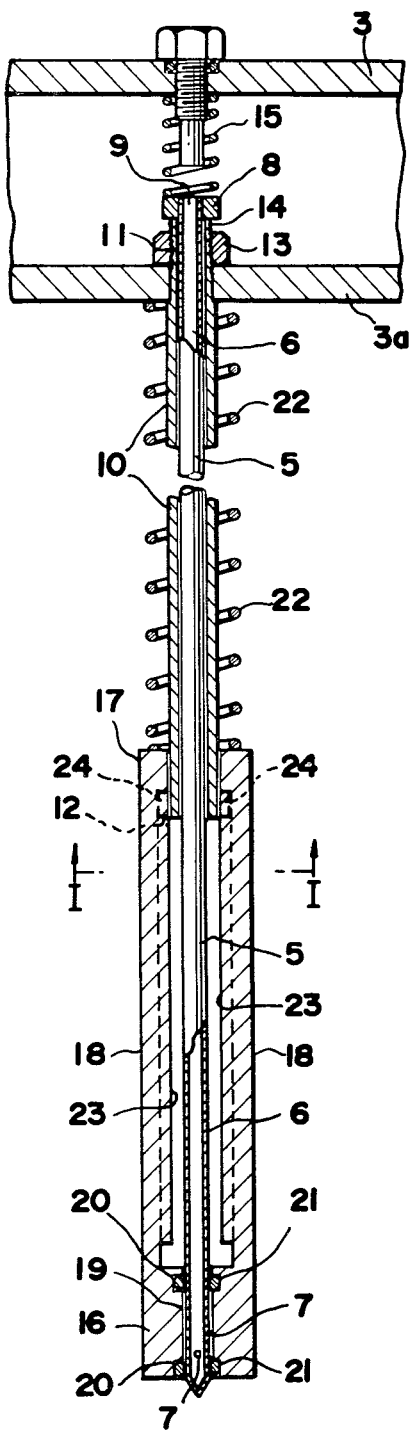
FIG. 2 is a cross-sectional view, on an enlarged scale, showing an injector unit included in this apparatus.

The tank 3 is provided with a given number of injector units, each of which includes a needle 5 suspended from the bottom 3a of the tank 3 toward the meat M on the conveyor 2. Each needle 5 as shown most clearly in FIG. 2, is made of a hollow pipe and has at least one opening 7 through which the pickle is injected into the meat M, with a passageway 6, communicates through an opening 9 in the tank 3, communicating with the opening 7. The needle 5 has a head 8 at its uppermost end whereby the needle 5 is securely suspended from inside the tank 3. In addition, each needle 5 is mantled or covered by a sleeve 10 whose function will be hereinafter explained. The sleeve 10 is also threadably inserted into the bottom 3a of the tank 3 through threads 11 provided on the sleeve 10 and a fastening nut 13. The head 8 of the needle 5 rests on the nut 13 with a packing 14 interposed therebetween, with a spring 15 adapted to being provided which is damp or absorb an unexpected upward movement of the needle 5.

Figure 3:
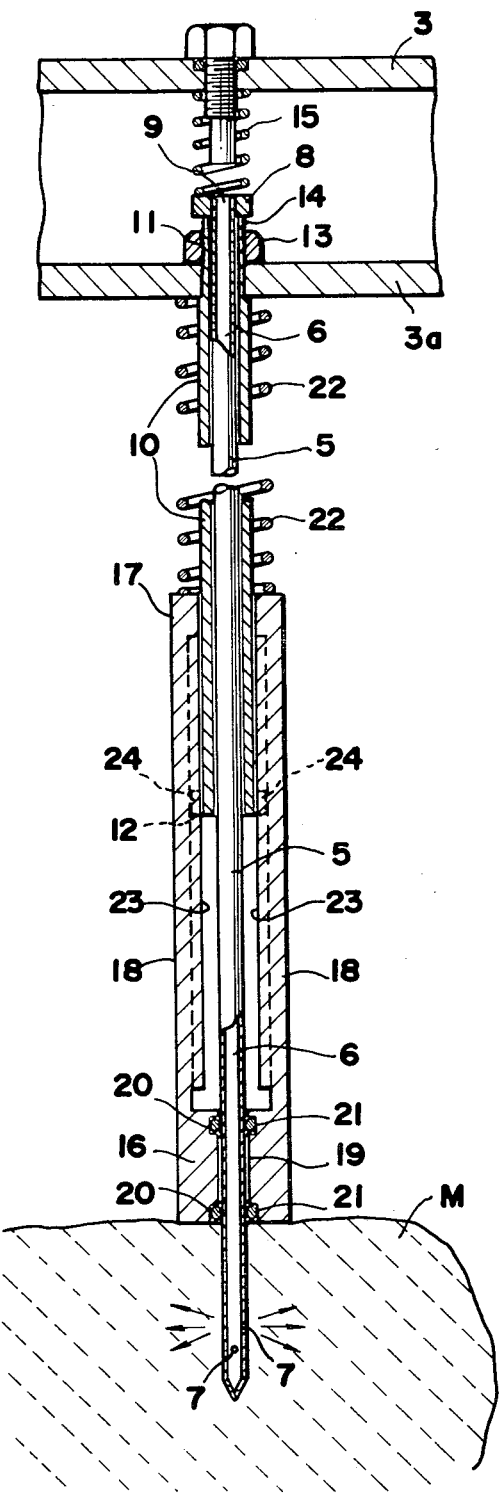
FIG. 3 is a cross-sectional view showing the unit of FIG. 2 in operation.

The sleeve 10 is provided with a flange 12 at its terminating end, which is adapted to be engaged with a cylindrical guide 17. The cylindrical guide 17 includes a pair of side pillars 18 and a valve section 16, which is formed at the terminating end of the cylindrical guide 17. The valve section 16 is intended to normally close the openings 7. The cylindrical guide 17 as a whole is made of wear-resisting material, such as Teflon or stainless steel. The valve section 16 is provided with a bore 19 axially produced to receive the needle 5, and, additionally, with a pair of ring-shaped recesses 20 in which O-rings 21 are fitted so as to prevent the pickle from leaking through the gaps between the needle 5 and the inside wall of the bore 19. The openings 7 of the needle 5 are normally closed when the cylindrical guide 17 is descended at its lowermost position as shown in FIG. 2, but when it is raised against a spring 22 fitted around the sleeve 10, the openings 7 are freed from the valve section 16, thereby allowing the pickle to flow into the meat M as shown in FIG. 3. This will be hereinafter explained hereinafter in greater detail.

Figure 4:
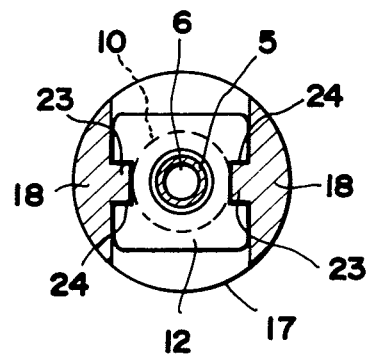
FIG. 4 is a cross-sectional view taken along the line I—I in FIG. 2.

The cylindrical guide 17 includes projecting rails 23 on the side pillars 18 as shown in FIG. 4, the projecting rails 23 being engaged in grooves 24 produced on the flange 12 of the sleeve 10. Under this arrangement the cylindrical guide 17 can move up and down along the sleeve 10. The cylindrical guide 17 is normally lowered by the spring 22, but when the tank 3 is lowered and places the terminating end of the cylindrical guide 17 into abutment with the meat M, the cylindrical guide 17 is pushed back against the spring 22 under the guidance provided by the projecting rails 23 and the grooves 24 as best shown in FIG. 3. In this way the openings 7 of the needle 5 are freed from the valve section 16, thereby allowing the pickle inside the passageway 6 to be force into the meat M. It is not permitted that such a gap as to allow the pickle to leak therethrough occurs between the needle 5 and the inside wall of the bore 19; in the present invention, however, a possible occurence of such gaps is effectively avoided by the guiding arrangement provided by the projecting rails 23 and the grooves 24. It is ensured that the needles 5 are inserted perpendicularly into the meat M.

The above described embodiment is operated in the following manner:

The tank 3 is periodically raised and lowered, in the course of lowering the tank 3 the terminating end of each cylindrical guide 17 comes into abutment with the meat M. As the tank 3 is further lowered, the cylindrical guide 17 is pushed back by the meat M against the spring 22, and the openings 7 of the needle 5 are freed from the valve section 16 so as to allow the pickle to discharge into the tissue of the meat M. In this case, if any needle 5 cannot reach the surface of the meat M because of unevenness on the surfaces of the meat M or a lack of the meat M beneath the needle 5, the opening 7 of the needle 5 remains covered by the valve section 16, so that the pickle is not permitted to flow out even with the introduction of pressure.

When the injection of the pickle is finished, the tank 3 is raised, thereby causing the needles 5 to rise up. But so long as the openings 7 are within the meat M the pickle continues to be injected. During the injection the cylindrical guides 17 are pressed against the surfaces of the meat M under the action of the spring 22, which is helpful in preventing the meat M from following the withdrawing needles 5. As soon as the terminating ends of the needles 5 become separated from the meat M, the valve sections 16 return to cover the openings 7 of the needles 5.

Figure 5:
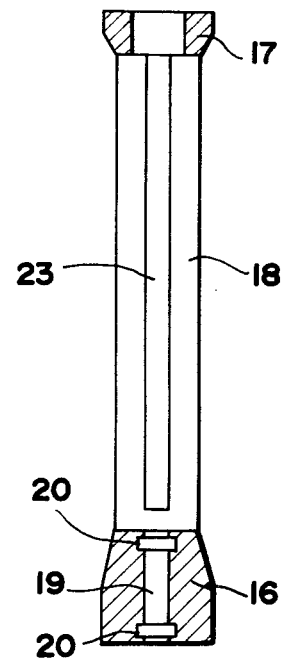
FIG. 5 is a partially cross-sectional view showing a cylindrical guide including a valve section.

The above described embodiment has an advantage that the cylindrical guide 17 is free from a possible blocking with fragmental pieces of meat M because of its open structure only surrounded by the two side pillars 18, as best shown in FIG. 5. Owing to this open structure the meat M sticking to or in the cylindrical guide 17 can be readily removed. In addition, such a structure can be constructed at a relatively inexpensive cost. The cylindrical guide 17, as a whole, can be made in one body of stainless steel or plastic.

Referring to FIGS. 6 and 7 an alternative embodiment will be explained:

The tank 3 is provided with a given number of needles 35, each of which has a pickle passageway 36 and an opening 37 communicating therewith. Each needle 35 is provided with a head 38 whereby the needle 35 can be suspended from inside the tank 3, with the passageway 36 of the needle 35 communicating with the tank 3 through an opening 39 disposed within the tank 3. The needle 35 is passed through a sleeve 40, with the sleeve 40 being threadably attached into the bottom surface 3a of the tank 3. The needle 35 can move up and down in the sleeve 40, but its upward movement is limited by a spring 41 mounted inside the tank 3. There is provided an O-ring 42 between the needle 35 and the sleeve 40.

The remaining structure of the apparatus of FIGS. 6 and 7 is substantially identical to that of the embodiment of FIGS. 1–5.

The sleeve 40 is connected to a cylindrical guide 45 with its flange 47 being engaged with an edge 46 of the cylindrical guide 45, wherein their relative movement is permitted. The cylindrical guide 45 has a valve member 43 fitted in its terminating end portion, the valve member 43 being intended to open and close the openings 37 of the needle 35. A O-ring 44 is adapted to keep liquid-tight seal between the needle 35 and the valve member 43. The cylindrical guide 45 is normally pressed in a downward direction by means of a spring 48, which means that the openings 37 are normally closed by the valve member 43. Thus, the pickle inside the passageway 36 is not permitted to flow out. This situation is illustrated most clearly in FIG. 6.

It will be readily understood that the embodiment FIGS. 6 and 7 will be operated in the same manner as the embodiment of FIGS. 1–5.

Figure 8:
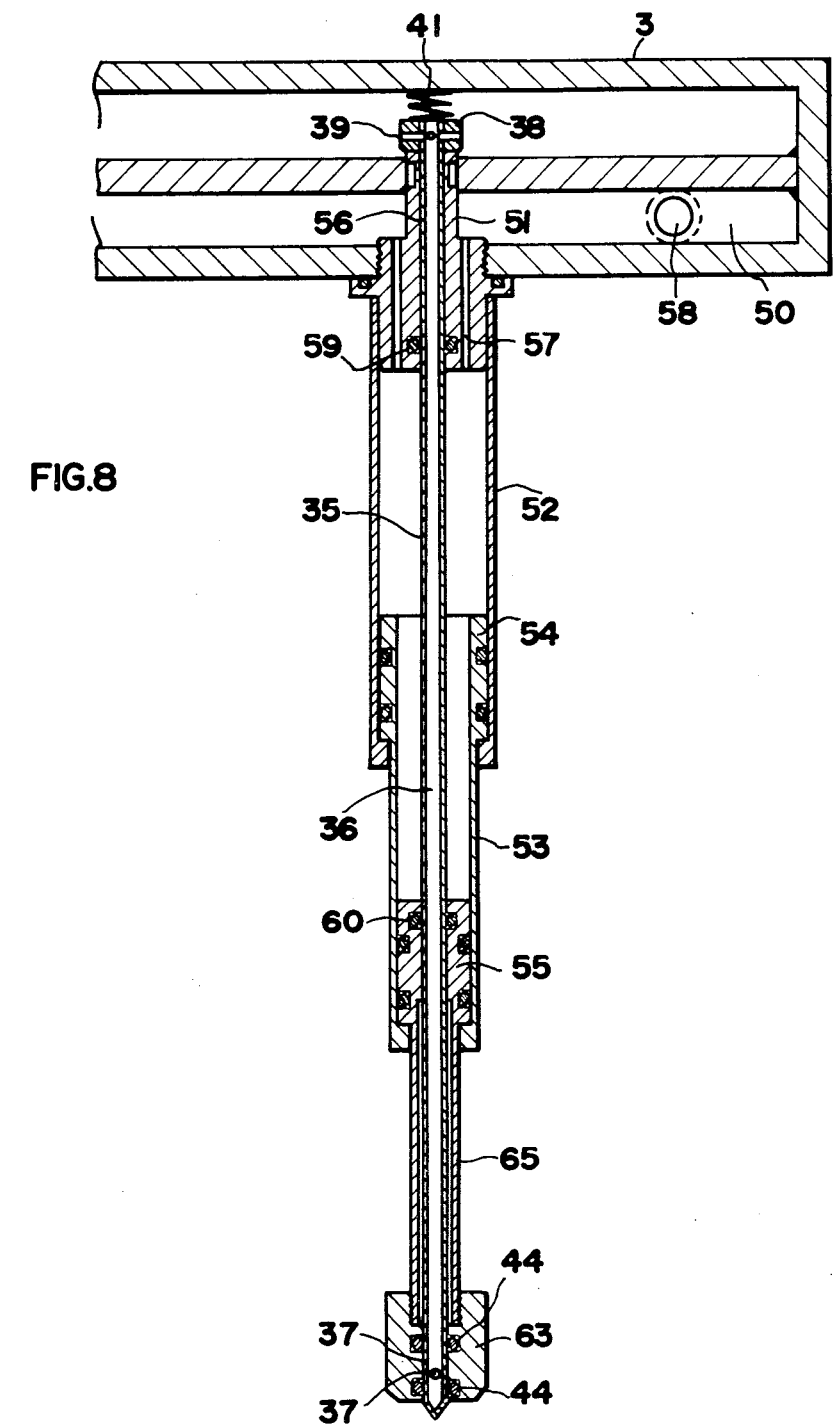
FIG. 8 is a cross-sectional view, on an enlarged scale, showing a further modified version of the injector unit.

FIG. 8 provides an example of yet another embodiment wherein a compressed air chamber 50 is provided underneath the tank 3, with a fixture 51 being threadably inserted into both the compressed air chamber 50 and the tank 3. To the fixture 51 a stationary cylinder 52 is fastened, in which a movable cylinder 53 is inserted. The movable cylinder 53 is provided with a piston 54 at its upper end portion in an air-tight manner against the inside wall of the stationary cylinder 52. The movable cylinder 53 is connected to a cylindrical guide 65, which is provided with a piston 55 at its upper end portion in an air-tight manner against the inside wall of the movable cylinder 53. The cylindrical guide 65 has a valve member 63 at its lower top end, which is adapted to open and close the openings 37 of the needle 35. The fixture 51 has a bore 56 adapted to allow the needle 35 to pass therethrough, and one or more paths 57 allowing the compressed air in the chamber 50 to flow into the stationary cylinder 52. The needle 35, passed through the bore 56 in the fixture 51, is suspended passing through the stationary cylinder 52, the movable cylinder 53 and the cylindrical guide 65. This arrangement is substantially the same as in the embodiments described above. Normally the openings 37 of the needle 35 are closed by the valve member 63. The compressed air chamber 50 is provided with an inlet port 58 through which a compressed air is introduced into the chamber 50. An O-ring 59 is adapted to secure an air seal between the fixture 51 and the needle 35. An O-ring 60 is adapted to secure an air seal between the cylindrical guide 65 and the needle 35.

In operation, when the pickle is to be injected into the meat, the tank 3 is lowered in the afore-mentioned manner, wherein the compressed air is not supplied to the cylinders 52 and 53. As described above, the top end of the needle 35 comes into abutment with the meat, and gradually penetrates into it until the openings 37 are free from the valve member 63. When the injection of the pickle is finished, and the needles 35 are to be withdrawn from the meat, the compressed air is introduced into the cylinders 52 and 53. Thus, the cylindrical guide 65 is fully extended, thereby enabling the valve member 63 to come into abutment with the meat. This prevents the meat from following the withdrawing needles 35.

The last embodiment can be modified such that instead of the compressed air, the pressure of the pickle per se can be used as a driving force on the movable cylinder 53 so as to cause same to lower.

As evident from the foregoing description, according to the present invention, the pickle is only injected into the meat into which the needle is penetrated, thereby avoiding wasting the pickle. In addition, it eliminates the necessity of collecting a spilled pickle. Under the conventional practice a large amount of pickle unavoidably spills outside the meat, and it is required to collect and recirculate it. One of the difficulties is that during the collecting and recirculating the pickle is subjected to a rising temperature and dilution, thereby resulting in the degraded quality. According to the present invention another advantage is that air is not permitted into the meat at the time of injection, so that there is no need for worrying about a possible contamination with germs in the air.

What is claimed is:

1. An automatic pickle injecting apparatus for supplying meat with a pickle, the apparatus comprising:
    a vertically movable tank adapted to contain said pickle;
    said tank being transversely disposed with respect to a feeding path of said meat;
    a plurality of needle means for enabling an injection of said pickle into the meat, each of said needle means having a first end adapted to be connected to the tank, a terminating end, and a passageway opening into the tank for permitting said pickle in said tank to pass therethrough, said passageway communicating with at least one opening provided at the terminating end of each of said needle means;
    a plurality of sleeve means mounted on said tank and respectively surrounding at least a portion of an axial length of the respective needle means for enabling a suspension of the needle means from the bottom of the tank;
    a cylindrical guide means displacably mounted on each of said sleeve means for guiding the respective needle means into the meat, said cylindrical guide means including a first end portion and a free end portion;
    a valve means disposed at the free end portion of said guide means, said valve means being movable along the axial length of the respective needle means between an upper and lower position so as to close and open said at least one opening such that when said valve means is at a lowermost position, it closes said at least one opening, thereby permitting no pickle to be discharged therethrough; and
    a valve holding means for urging said valve means to stay at the valve closing position.

2. An automatic pickle injecting apparatus as defined in claim 1, wherein said valve holding means is a spring provided between said tank and said cylindrical guide.

3. An automatic pickle injecting apparatus as defined in claim 2, wherein said spring is interposed between the first portion of said cylindrical guide means opposite said valve means and a bottom portion of said tank.

4. An automatic pickle injecting apparatus as defined in claim 1, wherein said valve holding means is a pneumatic cylinder.

5. An automatic pickle injecting apparatus as defined in claim 1, wherein means are provided for damping an upward movement of the respective needle means.

6. An automatic pickle injecting apparatus as defined in claim 5, wherein said means for damping includes a spring means interposed between the first end of the respective needle means and a portion of the tank.

7. An automatic pickle injecting apparatus as defined in claim 1, wherein said sleeve means includes a flange having grooves, and wherein said cylindrical guide means has an open structure with opposite pillar means extending along said needle means and projecting rails on and along said pillar means, said grooves receiving said projecting rails such that said projecting rails ar slidable under the guide provided by said grooves.

8. An automatic pickle injecting apparatus for supplying meat with a pickle, the apparatus comprising:
    a vertically movable tank adapted to contain said pickle;
    said tank being transversely provided with respect to a feeding path of said meat;
    a plurality of needles suspended from a bottom of said tank, each of said needles having a first end adapted to be mounted to the tank, a terminating end, and a passageway communicating with said tank for permitting said pickle in said tank to pass through said passageway;
    an opening provided at the terminating end of said needle in communication with said passageway;
    a sleeve fitted around each of said needles and affixed to said tank;

a cylindrical guide for each of said needles, each of said cylindrical guides having a terminating end and an open structure with opposite pillars extending along the respective needles, each of said cylindrical guides being adapted to slidable mantle the respective sleeves fitted around the needles;

a valve adapted to close and open said opening, said valve being formed at the terminating end of the cylindrical guide; and spring means located between said tank and each of said cylindrical guides, said spring means urging the respective cylindrical guides to descend to a lowermost position, thereby normally closing said opening.

9. An automatic pickle injecting apparatus as defined in claim 8, wherein each of said sleeves includes a flange having grooves, and wherein each of said cylindrical guides includes projecting rails on and along said pillars, said grooves receiving said projecting rails such that said projecting rails are slidable under the guide provided by said grooves.

10. An automatic pickle injecting apparatus as defined in claims 8 or 9, wherein said valve, said cylindrical guide and said pillars are made in one body of wear-resisting material.

* * * * *